(12) United States Patent
Russ

(10) Patent No.: US 11,007,842 B2
(45) Date of Patent: May 18, 2021

(54) FAN AND CANOPY ASSEMBLY FOR RIDING VEHICLE

(71) Applicant: William Russ, Belhaven, NC (US)

(72) Inventor: William Russ, Belhaven, NC (US)

( * ) Notice: Subject to any disclaimer, the term of this patent is extended or adjusted under 35 U.S.C. 154(b) by 223 days.

(21) Appl. No.: 16/266,381

(22) Filed: Feb. 4, 2019

(65) Prior Publication Data
US 2019/0241041 A1     Aug. 8, 2019

Related U.S. Application Data

(60) Provisional application No. 62/625,468, filed on Feb. 2, 2018.

(51) Int. Cl.
| | | |
|---|---|---|
| *B60R 19/34* | (2006.01) | |
| *B60H 1/00* | (2006.01) | |
| *B62D 33/06* | (2006.01) | |
| *B62D 25/06* | (2006.01) | |
| *B60H 1/24* | (2006.01) | |
| *A01D 34/00* | (2006.01) | |
| *A01D 75/00* | (2006.01) | |
| *A01D 67/02* | (2006.01) | |

(52) U.S. Cl.
CPC ......... *B60H 1/00471* (2013.01); *B60H 1/245* (2013.01); *B62D 25/06* (2013.01); *B62D 33/0625* (2013.01); *A01D 34/001* (2013.01); *A01D 67/02* (2013.01); *A01D 75/00* (2013.01); *B60H 1/00364* (2013.01)

(58) Field of Classification Search
CPC ............... B60H 1/00471; B60H 1/245; B60H 1/00364; B62D 33/0625; B62D 25/06; A01D 34/001; A01D 75/00; A01D 67/02; F04D 25/088; F04D 29/601; F21V 33/0096; A45B 3/00; A61G 11/00
See application file for complete search history.

(56) References Cited

U.S. PATENT DOCUMENTS

| | | | | |
|---|---|---|---|---|
| 2,817,281 A | * | 12/1957 | Schwan ............... | B60J 7/08 454/189 |
| 3,489,374 A | * | 1/1970 | Morcom ............ | B64C 39/06 244/12.2 |
| 3,939,802 A | * | 2/1976 | Neff .................. | A01K 61/80 119/51.04 |
| 4,112,957 A | * | 9/1978 | Biven ............... | A45B 11/00 135/87 |
| 4,297,057 A | * | 10/1981 | O'Neil .............. | E21D 19/02 175/219 |
| 4,710,778 A | * | 12/1987 | Radov ............... | H01Q 1/42 343/720 |
| 5,042,456 A | * | 8/1991 | Cote ................ | F24C 15/2028 126/299 D |

(Continued)

*Primary Examiner* — Kiran B Patel
(74) *Attorney, Agent, or Firm* — Maier & Maier, PLLC

(57) ABSTRACT

A downdraft fan assembly mountable on a vehicle roll bar, which may be used for providing a flow of ambient air over the vehicle operator, and a canopy carried by the fan assembly, which may be used for providing solar and precipitation protection for the operator. The downdraft fan may draw air through a roof cap with a rear-facing outlet, or may draw air through a series of vents disposed around the canopy of the assembly, or through some combination of the two, such as may be desired. In some variations, multiple openings may be provided in the roof, if desired.

15 Claims, 14 Drawing Sheets

(56) References Cited

U.S. PATENT DOCUMENTS

| | | | | |
|---|---|---|---|---|
| 5,044,298 A * | 9/1991 | Pepper | B63B 17/02 | 114/361 |
| 5,172,711 A * | 12/1992 | Mueller | A45B 3/00 | 135/16 |
| 5,299,337 A * | 4/1994 | Venza | A47C 16/005 | 5/656 |
| 5,579,797 A * | 12/1996 | Rogers | B63B 17/02 | 135/90 |
| 5,711,095 A * | 1/1998 | Oda | E02F 3/325 | 180/327 |
| 5,806,622 A * | 9/1998 | Murphy | B60K 26/02 | 180/210 |
| 5,845,886 A * | 12/1998 | McCormick | F04D 25/088 | 248/200.1 |
| 6,027,137 A * | 2/2000 | Rura | A47D 15/00 | 280/650 |
| 6,202,394 B1 * | 3/2001 | Russ | A01D 34/001 | 180/84 |
| 6,213,935 B1 * | 4/2001 | Mackin | A61G 11/00 | 600/22 |
| 6,317,910 B1 * | 11/2001 | Wilson | A47C 29/003 | 135/90 |
| 6,409,206 B1 * | 6/2002 | Willrich | B62B 9/00 | 261/DIG. 3 |
| 6,431,924 B1 * | 8/2002 | Dolhay | B60F 3/0092 | 440/11 |
| 6,443,591 B1 * | 9/2002 | Swensson | A61G 13/108 | 362/130 |
| 6,637,759 B2 * | 10/2003 | Jones | A63H 33/003 | 280/1.188 |
| 6,729,830 B2 * | 5/2004 | Wagner | E02F 3/283 | 414/686 |
| 6,896,088 B2 * | 5/2005 | Dahl | B60K 31/10 | 180/305 |
| 6,935,944 B2 | 8/2005 | Bigelow, Jr. | | |
| 7,150,162 B1 * | 12/2006 | Brunner | F24F 6/14 | 62/306 |
| 7,188,865 B2 * | 3/2007 | Sugiyama | E02F 9/0833 | 280/759 |
| 7,320,380 B2 * | 1/2008 | Ueda | E02F 9/0808 | 180/327 |
| 7,431,377 B2 * | 10/2008 | Tyrer | B60J 7/1278 | 296/100.14 |
| 7,481,289 B2 | 1/2009 | Ueda et al. | | |
| 7,566,095 B2 * | 7/2009 | Reeb | A47C 7/66 | 297/184.15 |
| 7,581,539 B2 * | 9/2009 | Aviles | B01D 45/08 | 126/299 D |
| 7,828,097 B2 * | 11/2010 | Kondou | E02F 9/0833 | 180/68.1 |
| 7,849,951 B2 * | 12/2010 | Borchers | B66F 9/07586 | 180/305 |
| 7,874,392 B2 * | 1/2011 | Nobayashi | E02F 9/16 | 180/89.17 |
| 8,083,019 B2 | 12/2011 | Fujita et al. | | |
| D662,870 S * | 7/2012 | Russ | D12/404 | |
| 8,262,149 B1 * | 9/2012 | Russ | B62D 33/0625 | 296/102 |
| 8,360,833 B2 | 1/2013 | Grantham | | |
| 8,398,145 B2 | 3/2013 | Russ | | |
| 8,720,971 B2 | 5/2014 | Russ | | |
| 9,101,222 B2 | 8/2015 | Minkoff et al. | | |
| 9,254,734 B2 * | 2/2016 | Held | B60J 5/06 | |
| 2003/0070328 A1 * | 4/2003 | Spommer | E02F 9/0808 | 37/304 |
| 2003/0070861 A1 * | 4/2003 | Dahl | B62D 21/186 | 180/312 |
| 2003/0073400 A1 * | 4/2003 | Dahl | B60H 1/00535 | 454/139 |
| 2004/0221882 A1 * | 11/2004 | Watson | A45B 3/00 | 135/16 |
| 2005/0107026 A1 * | 5/2005 | Bigelow, Jr. | B60H 1/00407 | 454/143 |
| 2005/0164627 A1 * | 7/2005 | Boone, Jr. | A45B 3/00 | 454/338 |
| 2005/0210717 A1 * | 9/2005 | Ueda | E02F 9/163 | 37/443 |
| 2006/0261225 A1 * | 11/2006 | Dore | F04D 25/08 | 248/228.2 |
| 2007/0293136 A1 * | 12/2007 | Hancock | B60H 1/00407 | 454/143 |
| 2008/0169013 A1 * | 7/2008 | Brockel | E04H 15/14 | 135/93 |
| 2009/0242311 A1 * | 10/2009 | Fujita | E02F 9/0808 | 180/291 |
| 2010/0300648 A1 * | 12/2010 | Grantham | H05K 7/20745 | 165/55 |
| 2014/0097652 A1 * | 4/2014 | Minkoff | A47C 7/744 | 297/180.14 |
| 2017/0341495 A1 * | 11/2017 | Thomas | A01D 34/43 | |
| 2018/0257468 A1 * | 9/2018 | Cook | B60J 7/12 | |
| 2019/0031003 A1 * | 1/2019 | Bennett | B60J 7/123 | |
| 2020/0023714 A1 | 1/2020 | Russ | | |

* cited by examiner

FAN AND CANOPY ASSEMBLY FOR RIDING VEHICLE

CROSS-REFERENCE TO RELATED APPLICATIONS

This application claims priority from U.S. Provisional Patent Application No. 62/625,468, filed on Feb. 2, 2018, entitled "FAN AND CANOPY ASSEMBLY FOR RIDING VEHICLE," the entire contents of which are hereby incorporated by reference.

BACKGROUND

Certain downdraft fan systems for riding vehicles, such as riding lawnmowers or other lawn or farm equipment, are known in the art. Such downdraft fan systems may be used to, for example, direct a constant flow of ambient air downwardly over the operator in order to provide protection from heat exposure, dust, biting insects, or other potential irritations or hazards. Such systems have been well-accepted and have provided improved working conditions for the operator under adverse environmental conditions.

However, certain operating environments or operating conditions can present some concerns for a downdraft fan system, and can either impair the functionality of a downdraft fan system or cause it to potentially present risks to a user. For example, certain positioning of the fan may draw air from ground level, or another location in which contaminants are present, which may result in an undesirable presence of dust, insects and contaminants in the circulating stream. Certain configurations of a fan can also make it more difficult to mount the fan or can interfere with operator vision and freedom of movement. For example, certain vehicles (such as, for example, combine harvesters) can kick up a great deal of particulate matter in the front or back of a vehicle, making it undesirable to draw air from the area that has been contaminated.

SUMMARY

According to an exemplary embodiment, a fan assembly for a riding vehicle may be provided. The fan assembly may have at least one fan and a canopy. The at least one fan may be attached to at least one of the canopy and the riding vehicle. Furthermore, the canopy may be attached to at least one of the riding vehicle and the at least one fan. Such a canopy and fan system may be provided such that the canopy is directly mounted on the fan, or such that the fan is directly mounted on the canopy, without additional mounting hardware being necessary.

According to a first exemplary embodiment, a canopy and fan system may be provided such that the canopy includes an inner opening circumscribed by an inner flange that overlies the perimeter of the fan assembly without limiting air flow to the fan blades. In some exemplary embodiments, in which the canopy is attached to the fan assembly, the flange may be attached to an existing fan structure, which may thus allow for a convenient retrofit to be provided to a fan structure that exists as a stand-alone device or to which a different canopy is attached. The opening may be covered by a roof cap that allows for free air intake while shielding against sun and precipitation, and which may draw air from the rear-end side of the canopy in order to direct it into the cab. According to some exemplary embodiments, providing a fan and canopy system that draws air from the rear side may ensure that the fan and canopy system results in substantially cooler operating conditions even under extreme solar and moisture conditions, but that the fan and canopy system further does not draw debris or other undesirable matter into the fan through the front of the canopy, such as matter that is kicked up into the air by the forward motion of the vehicle or matter that the vehicle encounters (such as insects) while moving forward.

According to such an exemplary embodiment, the fan and canopy may be provided so as to be disposed on a generally vertically extending U-shaped roll bar assembly including a horizontal transverse upper arm located behind an operator seat for the vehicle, including a generally rectangular tubular frame member connected at a rear end to said upper arm or said roll bar assembly and extending forwardly and horizontally therefrom, said frame circumscribing a frame opening above said operator seat, the downdraft fan being connected to the frame member and being mounted in said frame opening; the canopy having a center opening circumscribed by an interior peripheral flange engaging said frame member; fastener means connecting said canopy to said frame member, said center opening providing an inlet for said fan and drawing inlet air from above said canopy for direction over said operator seat and said canopy providing protection for said operator from solar and moisture, with said inlet drawing specifically from the rear side of the vehicle. The fan and canopy assembly may also include an apertured panel in said frame opening and a pair of strap members connected transversely to a bottom surface of said canopy with center sections spanning said openings, wherein said fastener means are connected said center sections of said strap members to said apertured panel.

According to a second exemplary embodiment, a canopy and fan system may instead be provided with vents, such as grated vents, which may be provided around the circumference of the canopy. According to an exemplary embodiment, any or all of the front, sides, or back of the canopy may have such vents disposed on all or a portion of the surface area of the canopy, such that air may be drawn through the vents of the canopy and into the fan rather than being drawn in through an inlet disposed in the top of the canopy. According to an exemplary embodiment, the grates on each vent may be relatively small or relatively large, or in an alternative embodiment the grates on some or all of the vents may be left off, such as may be desired.

According to an exemplary embodiment, a fan and canopy assembly according to a second exemplary embodiment may be provided so that it is coupled to the riding vehicle in the same manner or a similar matter to a first exemplary embodiment, or may be provided such that it is coupled to the riding vehicle in any other manner such as may be desired. For example, according to an exemplary embodiment, a vented fan and canopy assembly may be provided such that the vented fan and canopy assembly is provided on a generally vertically-extending U-shaped roll bar assembly, including a horizontal transverse upper arm located behind an operator seat for the vehicle including a generally rectangular tubular frame member connected at a rear end to said upper arm or said roll bar assembly and extending forwardly and horizontally therefrom, said frame circumscribing a frame opening above said operator seat. The downdraft fan may be connected to said frame member and mounted in said frame opening. The canopy may then be disposed on this frame member and coupled to it by a fastener means. Air may then be drawn from the grated vents in the canopy, which may be disposed on any or all of the sides of the canopy such as may be desired and with or without grates such as may be desired, for direction over said operator seat. The canopy may thus provide protection for said operator from solar and moisture. The fan and canopy assembly may also include an apertured panel in said frame opening and a pair of strap members connected transversely to a bottom surface of said canopy with center sections spanning said openings, wherein said fastener means are connected said center sections of said strap members to said apertured panel.

According to a third exemplary embodiment, a canopy and fan system may instead be provided with an intake hole provided near the back of the canopy, which may allow air to be conducted through an air duct and into an outflow duct disposed over the cabin. According to an exemplary embodiment, a fan may be disposed near the rear of the canopy and fan system (and may, for example, be a centrifugal fan disposed so as to conduct air directly into the hole using an impeller oriented in the direction of the hole) or may be disposed elsewhere or combined with other fans such as may be desired. In an exemplary embodiment, a centrifugal fan or any other fans may likewise be powered by a vehicle power system or may be powered by any other power supply system such as may be desired.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment, and referring generally to the Figures, various exemplary implementations of a canopy and fan assembly, such as may be fitted to a riding vehicle or any other vehicle such as may be desired, may be disclosed. According to some exemplary embodiments, the canopy and fan assembly may provide the vehicle with a flow of ambient air over a vehicle operator, and may likewise provide a canopy that protects the operator from sun, precipitation, or any other environmental hazards that it may be desired to protect the operator from.

Figure 1:
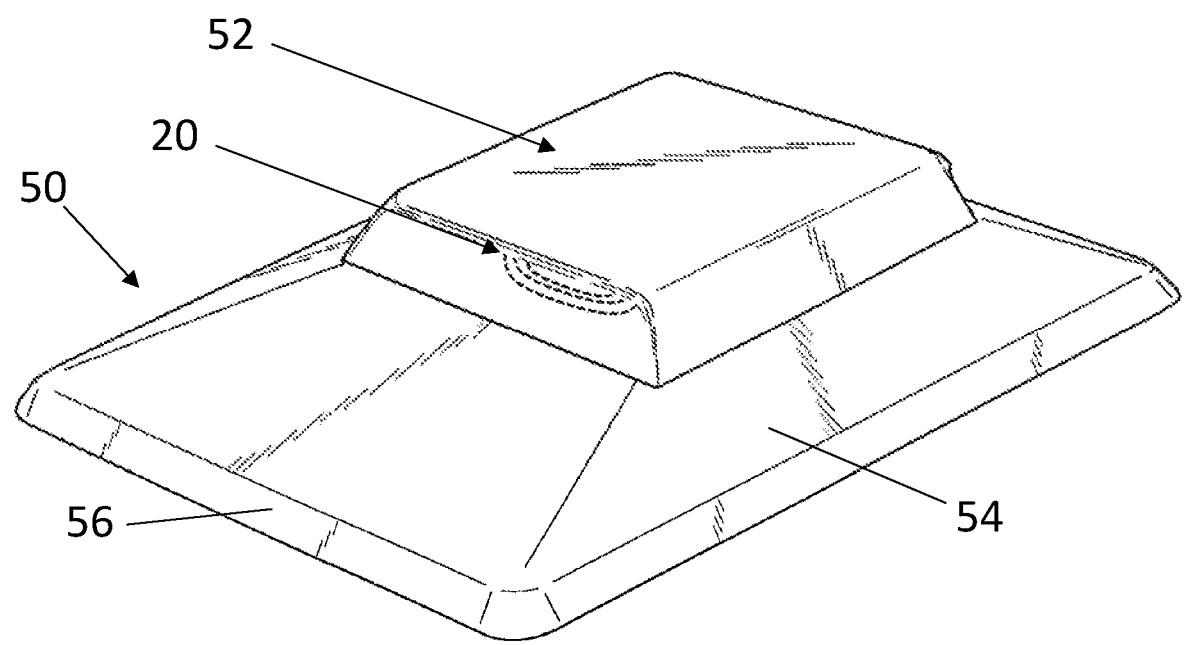
FIG. 1 is an isometric view of an exemplary embodiment of a canopy having a roof cap with a rear opening.

Turning now to exemplary FIG. 1, FIG. 1 displays an exemplary embodiment of a canopy and fan assembly 12. According to an exemplary embodiment, the canopy and fan assembly may be provided on a roll bar assembly of a riding vehicle, or may otherwise be provided on the riding vehicle or on any other vehicle, such as being integrated with an existing canopy or roof structure such as may be desired. (For example, in some exemplary embodiments, it may be desired to integrate a canopy and fan assembly into a vehicle with an existing roof and with existing roof supports, such as a golf cart or club car; in such exemplary embodiments, a canopy and fan assembly may be substituted for the existing roof structure and coupled to the existing roof supports, or the canopy and fan assembly may otherwise be integrated with the existing roof and/or existing roof supports, such as may be desired.) According to an exemplary embodiment, the canopy assembly may include a shell, such as a molded fiberglass shell 50 or a shell constructed from other material (such as metal, plastic, composite, or even from less regularly used materials such as wood), and may include a roof cap 52. According to an exemplary embodiment, the roof cap 52 may include an opening disposed at the rear of the canopy and fan assembly 12, such that airflow may be directed from the rear section of the canopy through the fan and down onto the operator.

According to an exemplary embodiment, the shell 50 of the canopy assembly may be, for example, a generally rectangular, slightly domed, roof section 54 peripherally terminating with a downwardly extending flared peripheral rim 56. Other variants of the shell 50 may be contemplated; for example, according to an exemplary embodiment, it may be desired to have a trapezoidal roof that is narrower at one end than at the other, or may be desired to have another shape of the roof such as may be desired.

The roof section 54 may include an opening, which may, for example, be a rectangular opening or may be any other shape of opening such as may be desired. This opening may be generally centrally positioned, for example being centrally laterally positioned and longitudinally positioned towards the rear, or may otherwise be positioned such as may be desired, so as to position a fan configured to draw air from the opening so that it is directly over the operator seat. Multiple openings (which may, for example, be covered by a single roof cap or by multiple roof caps, such as may be desired) may also be contemplated, and in some exemplary embodiments a set of multiple openings may be paired with one or multiple fans such as may be desired (or multiple fans may be disposed in one opening). For example, according to an exemplary embodiment, an opening may be split into four separate openings, in the style of a paned window, with the opening being bridged by support structures; in such an exemplary embodiment, one fan may still be used, which may be configured to draw air through each of the openings such as may be desired.

Figure 2:
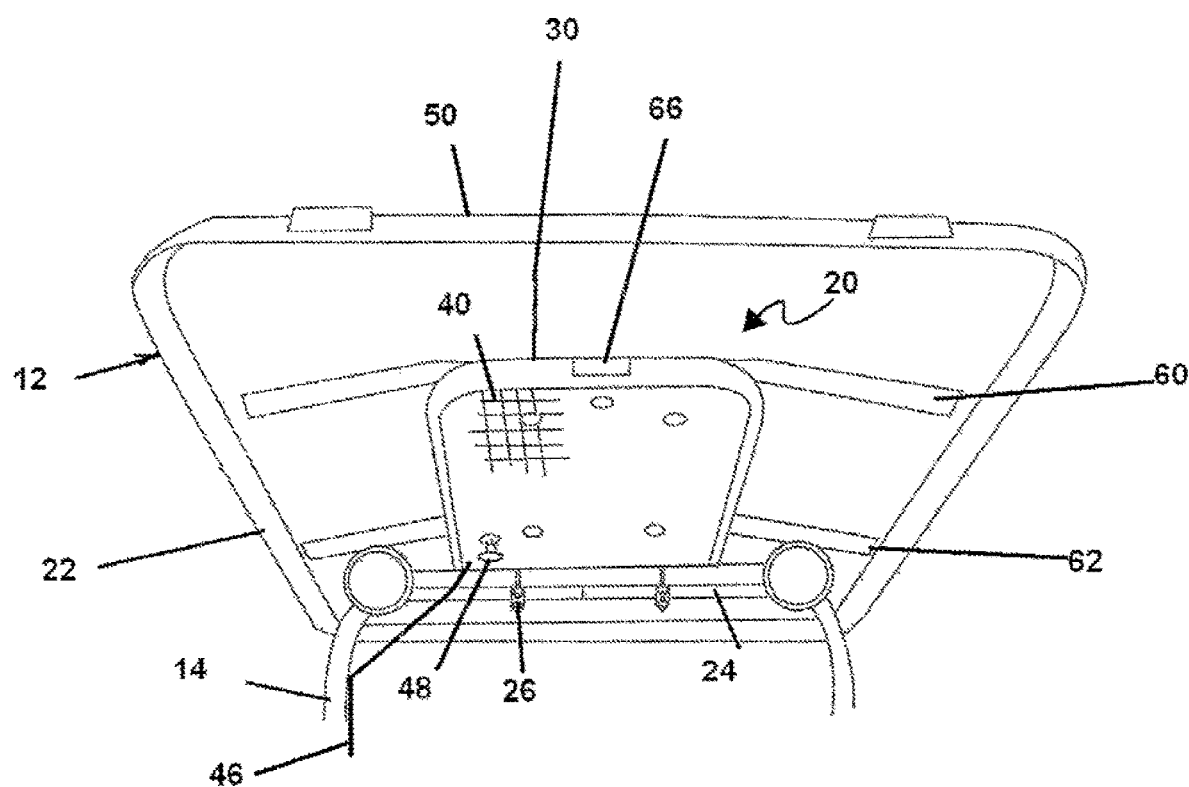
FIG. 2 is a front perspective view of an exemplary canopy and fan assembly.
Figure 3:
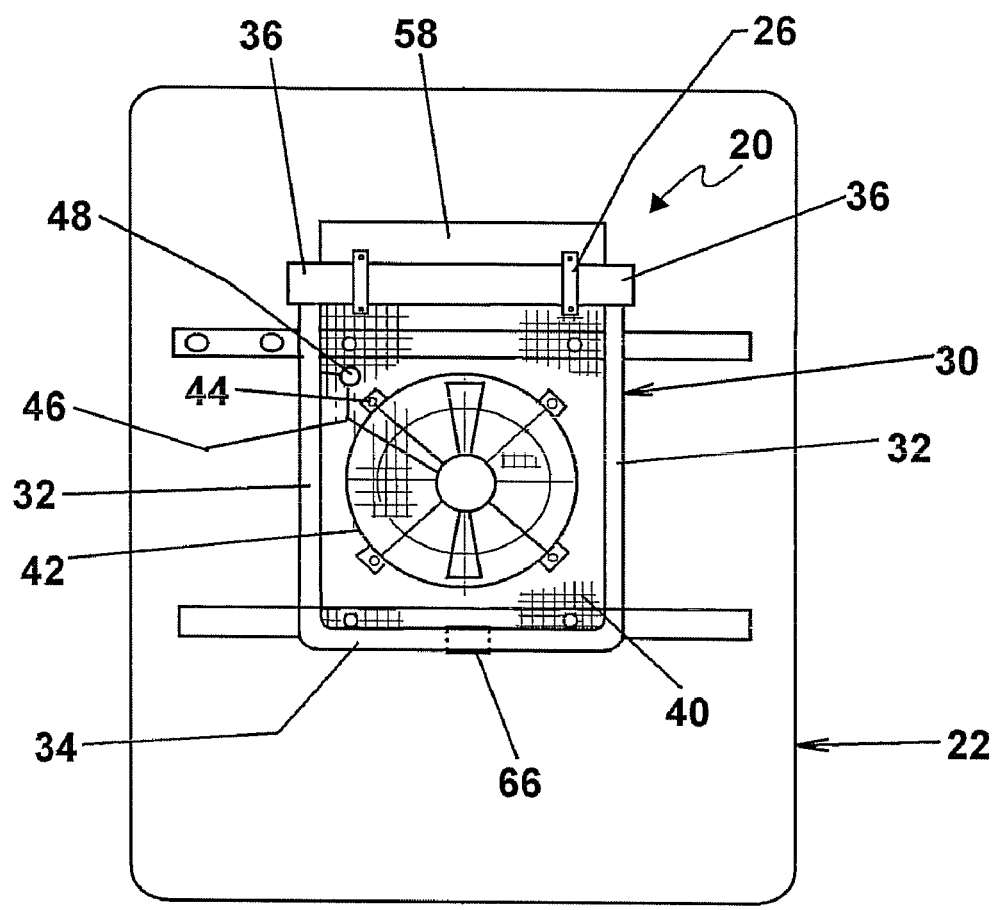
FIG. 3 is a bottom view of an exemplary canopy and fan assembly.

Referring now to FIGS. 2 and 3, the canopy and fan assembly 12 may, according to an exemplary embodiment, include a downdraft fan assembly 20 carrying a canopy assembly 22. In an exemplary embodiment, the fan assembly 20 may be supported on the lateral horizontal cross member 24 of the roll bar assembly 14. As depicted in prior patents (such as, for example, U.S. Pat. No. 8,262,149, which depicts the construction of a similar canopy assembly in more detail and which is herein incorporated by reference), the fan assembly 20 may be independently mounted on the cross member by laterally spaced U-bolt assemblies 26. The canopy assembly 22 may, in some exemplary embodiments, be solely supported on the fan assembly 20, or may be provided with additional support such as may be desired (for example, as previously mentioned, the canopy assembly may be coupled to the four roof supporting elements of a golf cart or club car, or similar vehicle).

In some exemplary embodiments, the fan assembly 20 may include a peripheral support frame member 30, which may in some exemplary embodiments be generally rectangular (or may be another shape, such as being generally circular, depending on the shape of the fan), which may have laterally spaced side legs 32 and longitudinally spaced front and rear legs 34 and 36 respectively. The rear leg 36 may be connected to the cross member 24 by a pair of U-bolt clam assemblies 38 or by other connectors such as may be desired.

In some exemplary embodiments, the bottom of the frame member 30 may be covered by an apertured grille panel 40, wire mesh, expanded metal or the like. This may serve to protect the user against debris without restricting external airflow by providing such a grille panel or mesh on the intake portion of the canopy and fan assembly as opposed to the outflow portion. In other exemplary embodiments, such a mesh may be provided on the intake portion and not on the bottom of the frame member 30, which may ensure that debris is not drawn into the inner part of the fan such that it could be in a position to accumulate in the inner part of the canopy and fan structure or so that it could damage the fan. In still other exemplary embodiments, it may be desired not to provide a grate or mesh at all, or to provide a grate or mesh on either side of the fan; for example, it may be desired to provide a finer mesh on the intake portion of the fan assembly in order to protect the fan assembly against debris, and may be desired to provide a heavier grille or grate structure 40 on the bottom of the frame member 30 in order to ensure that the user's head does not accidentally come into contact with the fan assembly. Other variations may be contemplated as may be desired.

According to an exemplary embodiment, the down draft fan 42 may be attached to the panel by fasteners 44 as shown in FIG. 3. The fan 42 may be connected to a power cable 46, which may be connected to the power supply of the vehicle (or to an alternative power supply, such as a battery coupled to the fan, if it is not desired to connect the fan to the vehicle power supply) and may be controlled by an operator switch 48 with a control knob 49 mounted at the rear side of the panel 40 within convenient reach of the operator. Construction on the fan assembly is set forth in the above patent that is incorporated by reference, as well as in a further prior patent, U.S. Pat. No. 6,202,394, which is likewise hereby incorporated by reference.

Figure 4:
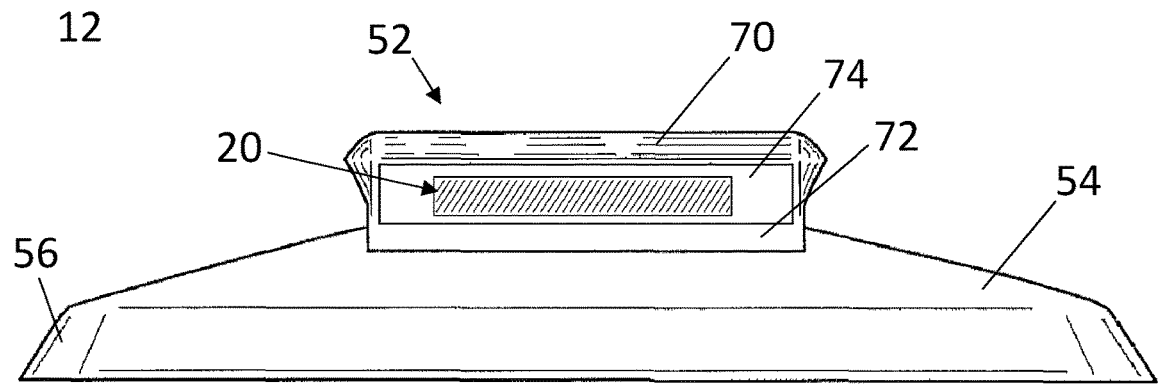
FIG. 4 is a rear view of an exemplary embodiment of a canopy having a roof cap with a rear opening.
Figure 5:
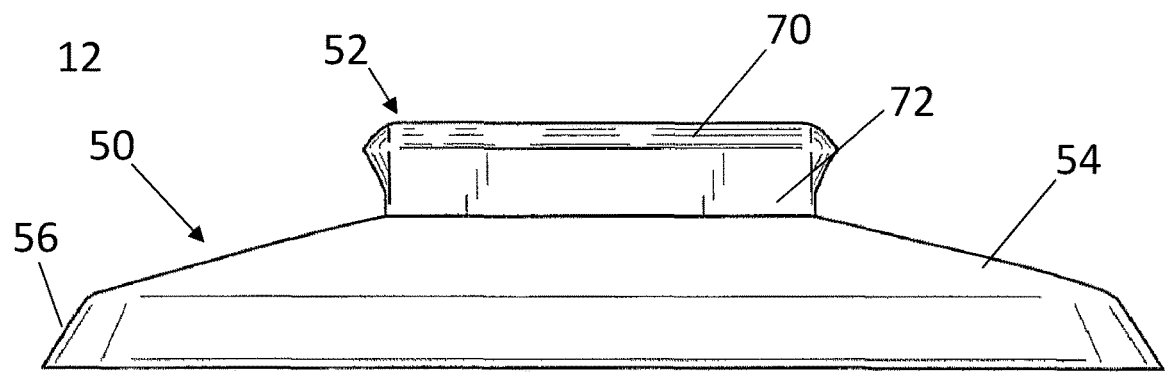
FIG. 5 is a front view of an exemplary embodiment of a canopy having a roof cap with a rear opening.
Figure 6:
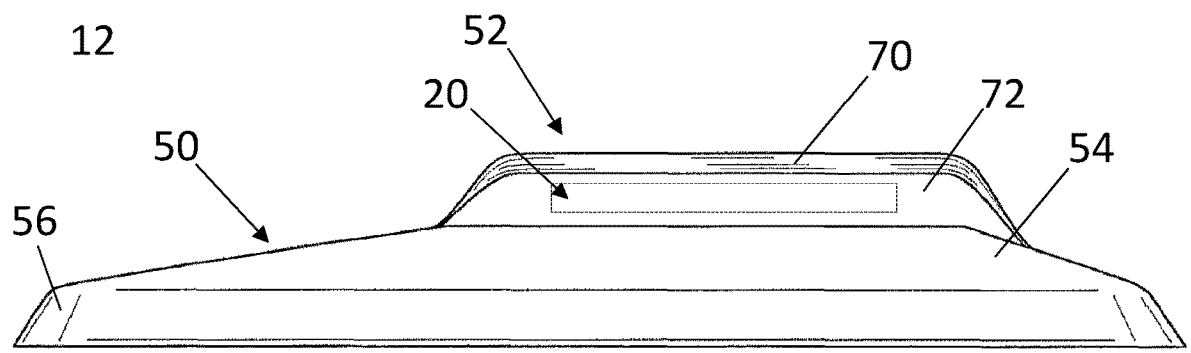
FIG. 6 is a side view of an exemplary embodiment of a canopy having a roof cap with a rear opening.

Turning now to exemplary FIGS. 4-6, FIGS. 4-6 depict an exemplary embodiment of a fan and canopy assembly 12 as shown from various angles. Specifically, FIG. 4 depicts an exemplary embodiment of a fan and canopy assembly 12 as shown from the rear, FIG. 5 depicts an exemplary embodiment of a fan and canopy assembly 12 as shown from the front, and FIG. 6 depicts an exemplary embodiment of a fan and canopy assembly 12 as shown from the side.

According to an exemplary embodiment, the roof cap 52 of the fan and canopy assembly 12 may include a rectangular top section 70 and a downwardly-extending support section 72. In some exemplary embodiments, a rectangular top section 70 may have any other shape other than being rectangular, such as may be desired; for example, according to an exemplary embodiment, a rectangular top section 70 may instead be a conical top section (with the base of the cone at the opening) which may serve to better direct airflow, may be circular or ovoid, or may have any other shape such as may be desired. According to some exemplary embodiments, the rectangular top section 70 and/or support section 72 may be formed from, for example, the same material as the shell 50 of the canopy structure, or may be formed from a different material, such as may be desired. In some exemplary embodiments, the support section 72 may be formed from downwardly-inclined depending legs or may be formed from another such structure as may be desired.

According to an exemplary embodiment, a roof cap 52 may be provided such that the rectangular top section 70 is slightly larger than the support section 72, and so that it is slightly larger than the opening disposed in the shell 50, so as to ensure that the rectangular top section 70 provides protection against the sun and against precipitation such as may be desired. The rectangular top section 70 may be placed over the opening such that the rectangular top section fully covers the opening from an overhead perspective, in order to provide such protection; in some exemplary embodiments, the lip of the rectangular top section 70, or the amount by which the rectangular top section 70 extends over the opening, may be variable in order to provide more or less protection such as may be desired. (For example, it may be desirable to increase the size of the rectangular top section 70 in order to provide additional protection against windblown precipitation that may otherwise easily be blown into the opening, or may be desirable to reduce the size of the rectangular top section 70 in order to reduce weight or reduce potential obstacles to airflow. Other shapes of the rectangular top section 70 may also be contemplated for this purpose and other shapes of the rectangular top section 70 may likewise be of any size, such as may be desired.)

According to an exemplary embodiment, an opening 74 may be disposed in the rear of the roof cap 52, such that air may be drawn by the fan 20 through the opening 74 and may be blown onto a user of the vehicle. According to an exemplary embodiment, the opening 74 in the roof cap 52 may be covered with a grate or mesh, or may be unobstructed, as may be desired. According to an exemplary embodiment, the opening 74 may be sized so as to offer an intake port of sufficient size for the flow capacity of the fan 20; according to some exemplary embodiments, the opening 74 may be relatively small and may not take up the entirely of the rear side of the roof cap 52, while in other exemplary embodiments the opening 74 may be relatively large and may take up the entirety of the rear side of the roof cap 52, which may be expanded to as large a size as may be desired (and may have different shapes, such as conical "scoop" shapes, such as may be desired).

Figure 7:
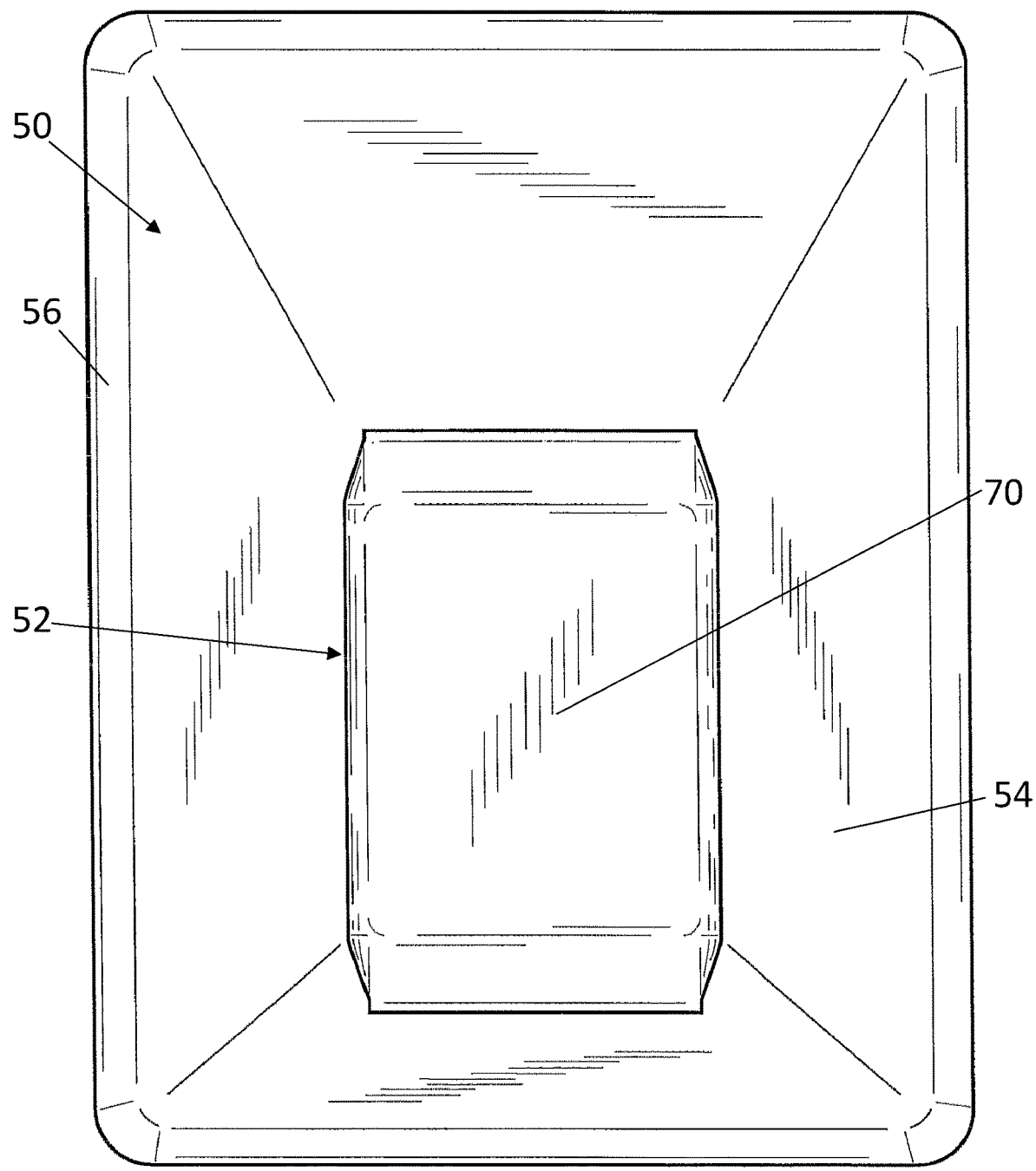
FIG. 7 is a top view of an exemplary embodiment of a canopy having a roof cap with a rear opening.

Turning now to exemplary FIG. 7, a top view of an exemplary embodiment of a fan and canopy assembly 12 may be displayed. According to an exemplary embodiment, the roof cap 52 may be disposed over an opening that is centrally laterally positioned and which is longitudinally positioned towards the rear of the fan and canopy assembly 12, so as to, in some exemplary embodiments, position the roof cap 52, the opening, and the fan directly above the operator seat. According to an exemplary embodiment, the remainder of the shell 50 may have a generally rectangular, slightly domed roof section 54 peripherally terminating with a downwardly extending peripheral rim 56. The rectangular top section 70 may be sized to overlap the support section 72, such as may be desired.

Figure 8:
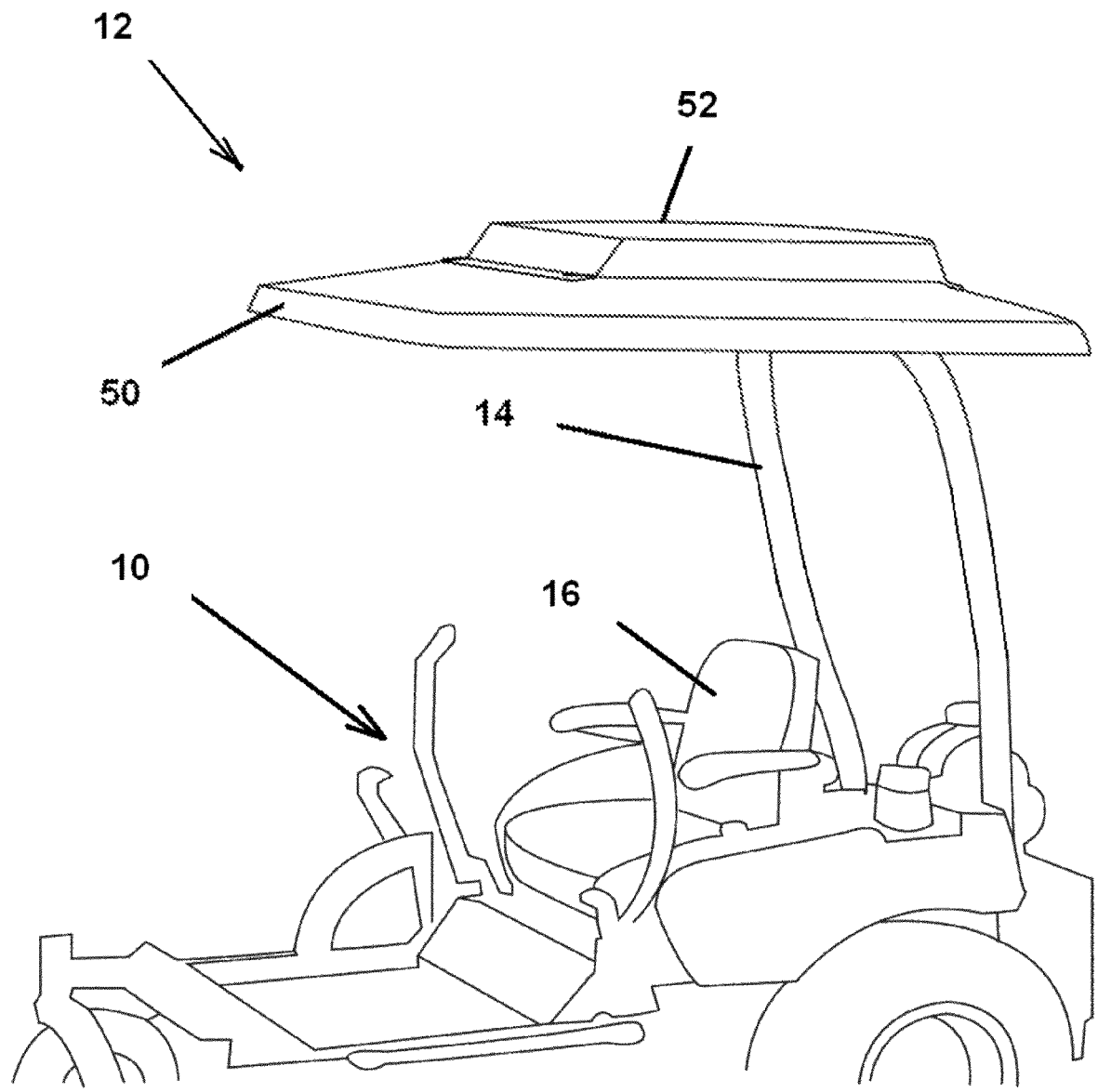
FIG. 8 is a perspective view of a riding vehicle fitted with an exemplary embodiment of a canopy and fan assembly.

Turning now to exemplary FIG. 8, FIG. 8 displays an open air motorized riding vehicle, such as a lawn mower 10, having a canopy and fan assembly 12. The canopy and fan assembly 12 may be supported on a roll bar assembly 14 of the vehicle or on any other appropriate supports such as may be desired. The canopy and fan assembly 12 may extend horizontally from the roll bar assembly 14 forwardly over and above the operator seat 16 and as described may provide solar and precipitation protection for the operator and a downward flow of ambient air to provide protection from heat exposure, dust and biting insects.

Figure 9:
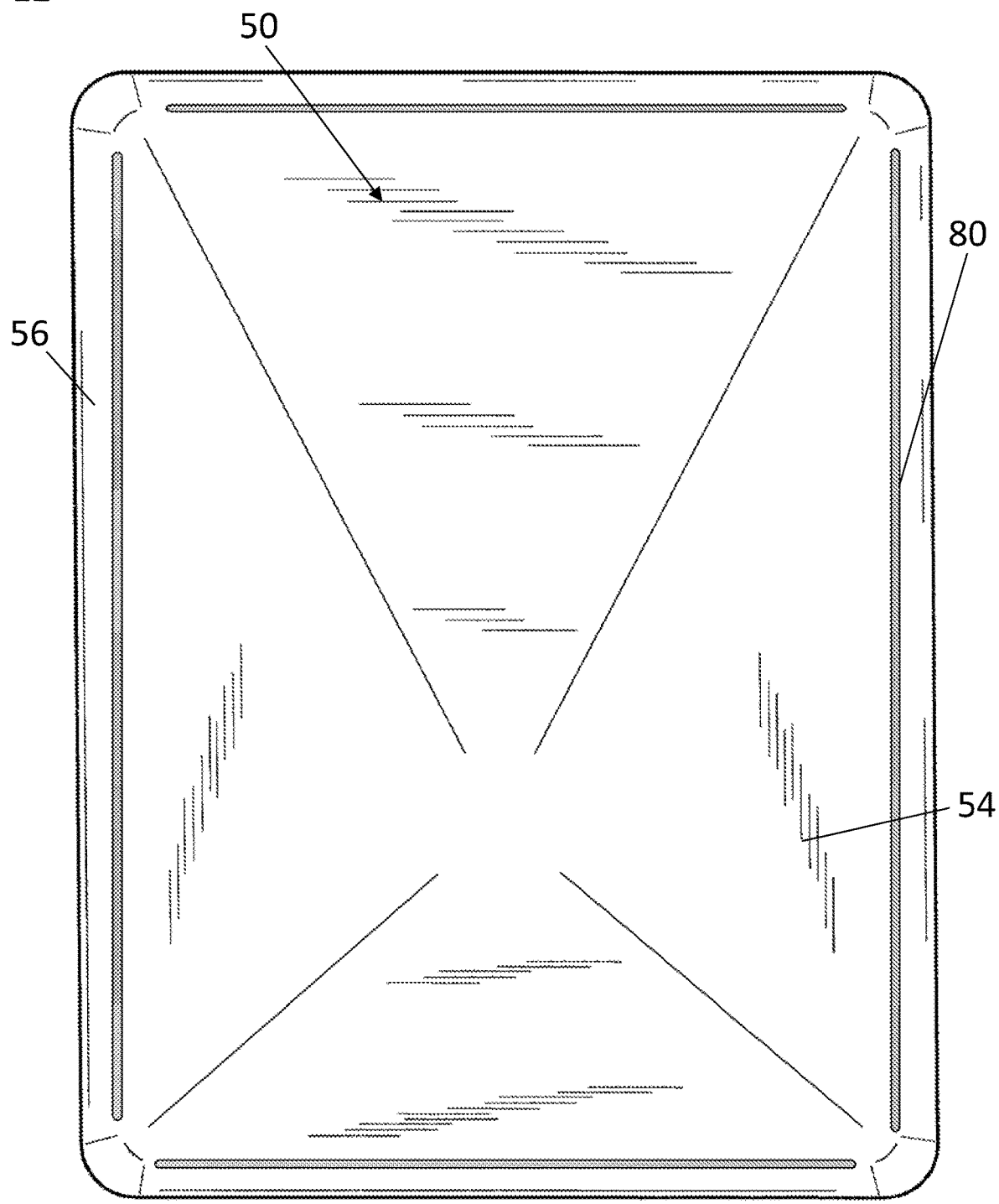
FIG. 9 is a top view of an exemplary embodiment of a canopy having a plurality of grated vents disposed around the perimeter.

Turning now to exemplary FIG. 9, FIG. 9 displays an alternative exemplary embodiment of a top view of an exemplary embodiment of a fan and canopy assembly 12. According to an exemplary embodiment, an intake portion of a fan and canopy assembly 12 may be moved from being a single inlet or series of inlets enclosed by a roof cap 52 or plurality of roof caps 52, to being disposed in a vent 80 or series of vents disposed around the perimeter of the shell 50 of the fan and canopy assembly 12. According to an exemplary embodiment, a fan and canopy assembly 12 may be structured so as to have a downwardly extending outwardly flared peripheral rim 56, and may be structured to have a generally rectangular, slightly domed, roof section 54 that is fully contiguous and unbroken by an opening disposed therein. (In other exemplary embodiments, a vent 80 or plurality of vents 80 may be incorporated into an exemplary embodiment of a fan and canopy assembly 12 that does have an inlet or series of inlets enclosed by one or more roof caps 52; according to such an embodiment, the vents 80 may be used in order to provide additional airflow, if such is desired, allowing the size of the inlet and roof cap 52 to be reduced, allowing the roof cap 52 to be oriented in a direction where it may receive less airflow such as in a direction facing the rear of the fan and canopy assembly 12, or allowing the size of the fan to be increased.)

Figure 10:
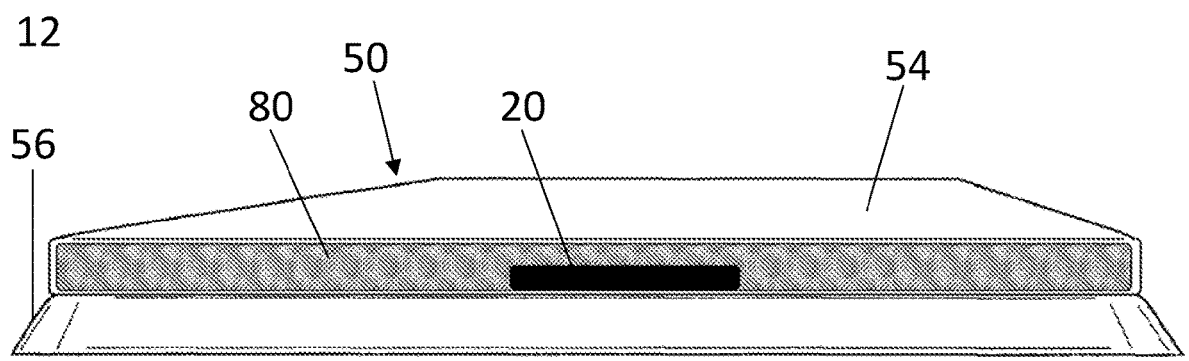
FIG. 10 is a side view of an exemplary embodiment of a canopy having a plurality of grated vents disposed around the perimeter.
Figure 11:
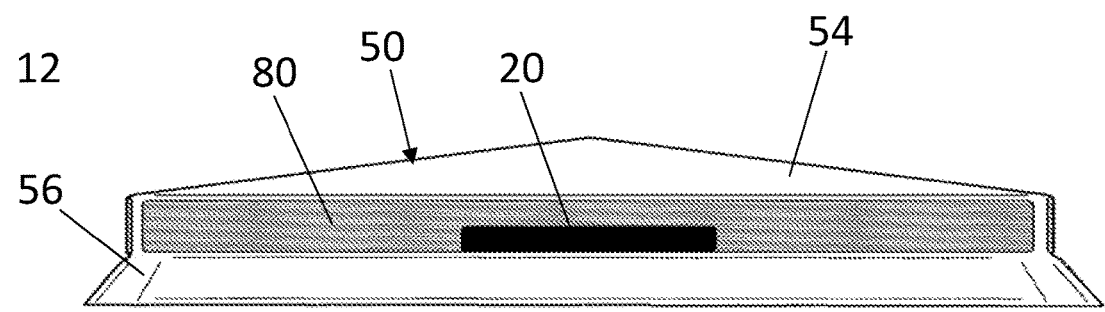
FIG. 11 is a rear view of an exemplary embodiment of a canopy having a plurality of grated vents disposed around the perimeter.

Turning now to exemplary FIGS. 10-11, FIG. 10 shows an exemplary embodiment of a fan and canopy assembly 12 as shown from the side, and FIG. 11 shows an exemplary embodiment of a fan and canopy assembly 12 as shown from the rear. According to an exemplary embodiment, a fan and canopy assembly 12 having a plurality of vents 80 may have said vents disposed around the perimeter of the fan and canopy assembly 12, on all or part of any or all of the faces of the fan and canopy assembly 12, such as on the front, back, left, and right sides of the fan and canopy assembly 12 if the fan and canopy assembly 12 has a generally rectangular shape, or on other sides of the fan and canopy assembly 12 if it has another shape. For example, vents 80 may be disposed around the perimeter or around a certain arclength of the perimeter if the fan and canopy assembly 12 is round or ovoid, such as may be desired.

According to an exemplary embodiment, a fan 20 may be disposed inside the fan and canopy assembly 12 such that the fan 20 is positioned directly over the operator seat, or in another location such as may be desired. For example, according to an exemplary embodiment, the fan 20 may be positioned such that it is centrally laterally positioned and longitudinally positioned somewhat closer to the rear. In some exemplary embodiments, the fan 20 may be coupled to the shell 50 of the fan and canopy assembly 12 as disclosed with respect to other exemplary embodiments; for example, the fan 20 may be coupled to the shell 50 of the fan and canopy assembly 12 by a pair of spaced lateral reinforcing and mounting straps are attached to the bottom surface of the roof section 54, and which may be attached to the bottom surface of the roof section 54 by suitable fasteners. According to an exemplary embodiment, since airflow may be provided from the sides of the fan 20 rather than being provided from an inlet disposed in front of the fan (or since less than 100% of the airflow may be provided from such an inlet, should one be provided alongside the vents), the fan 20 may be suspended from the bottom surface of the roof section 54 in such a manner that the intake side of the fan 20 is unobstructed, which may allow air to be more readily conducted downward onto the operator by the fan 20.

According to an exemplary embodiment, one or more of the vent structures 80 of the fan and canopy assembly 12 may be provided in such a manner as to be rectangular in shape. For example, according to an exemplary embodiment, a shell 50 of a fan and canopy assembly 12 may be structured so that the downwardly extending flared peripheral rim 56 is disposed on the bottom of the shell 50, beginning at a widest portion of the shell 50 at the base and narrowing slightly; the shell 50 may then extend vertically upward through a vent portion 80, which may in some exemplary embodiments be flat, and then finally may terminate in a roof section 54 provided on top of the vent portion. According to some exemplary embodiments, a roof section 54 may extend inward from the vent portion 80, or may alternatively have a portion that overhangs the vent portion 80 so as to better protect the vent portion 80 from the ingress of precipitation such as may be desired.

According to an exemplary embodiment, the fan and canopy assembly 12 may be constructed from a single piece or multiple pieces. For example, it may be contemplated that a part of the shell 50 encompassing the flared peripheral rim 56 and the vent portion 80 may be provided as a first part or a first assembly, and that a part of the shell 50 encompassing the roof section 54 may be provided as a second part or a second assembly, such that the roof section 54 can be placed on top of the lower part of the shell 50 in such a manner that the roof section 54 overhangs the lower part of the shell 50 and protects the vents 80 from the ingress of precipitation. Replacement of one component with another may also be contemplated and may be performed as desired; for example, it may be contemplated to have a roof section 54 with no inlet provided therein, a roof section 54 with an inlet of a given size or orientation provided therein (such as a rearward-facing inlet), and a roof section 54 with an inlet of a different size or orientation provided therein (such as a forward-facing inlet operable as a scoop), which may be interchangeable with one another. It may also be contemplated to have a roof section 54 be modular, such that an inlet may be exchanged for a different inlet or for a contiguous panel based on what is needed at the time.

Figure 12:
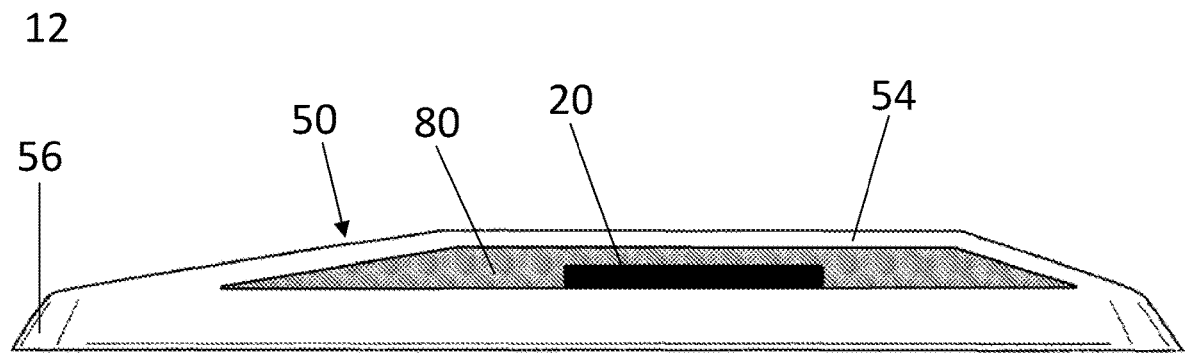
FIG. 12 is a side view of an alternative exemplary embodiment of a canopy having a plurality of grated vents disposed around the perimeter.
Figure 13:
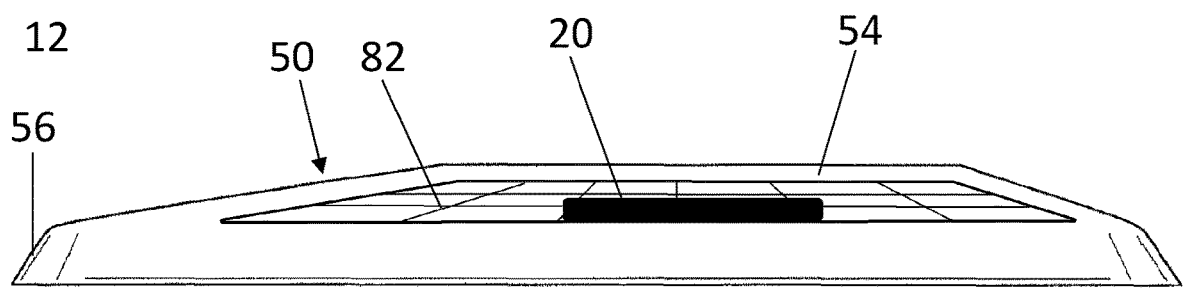
FIG. 13 is a side view of an alternative exemplary embodiment of a canopy having a plurality of grated vents disposed around the perimeter.

Turning now to exemplary FIGS. 12 and 13, FIGS. 12 and 13 may show variations on the exemplary embodiment of a fan and canopy assembly 12 that is provided above. Looking first at exemplary FIG. 12, according to an exemplary embodiment, it may be desired to have vents 80 disposed on the fan and canopy assembly such that the vents 80 are not rectangular, or such that vents 80 are provided only on certain sides of the fan and canopy assembly 12, such as may be desired. For example, according to an exemplary embodiment, vents may be disposed on the left and right side of the fan and canopy assembly 12, so as to provide side intake ports of sufficient size for the flow capacity of the fan. According to such an exemplary embodiment, the left and right sides of the fan and canopy assembly 12 may be structured so that they extend upward vertically over the portion of the fan and canopy assembly 12 in which the vents are disposed. However, the front and back sides of the fan and canopy assembly 12 may be sloped, as shown in FIGS. 12 and 13. This may serve to ensure that the roof section 54 is generally sloped in order to channel precipitation away from the roof section 54, while still ensuring that vertical vents 80 may be provided on the sides of the shell 50, ensuring that air can enter the inner part of the fan and canopy assembly 12 without exposing a large surface area of the vents 80 to precipitation through disposing them on a sloped surface. Again, according to an exemplary embodiment, an overhang may be provided over such vents 80 if desired.

Looking next at exemplary FIG. 13, it may be understood that the vents 80 of the fan and canopy assembly 12 may be protected by any type of screen, mesh, grille, grate, or other such structure as may be desired. The mesh or grate of the vents 80 may be as coarse or fine as may be desired. For example, FIG. 13 shows an example of a coarse grille 82 being provided to protect a vent rather than a fine mesh as in the exemplary embodiment of FIG. 12.

Figure 14:
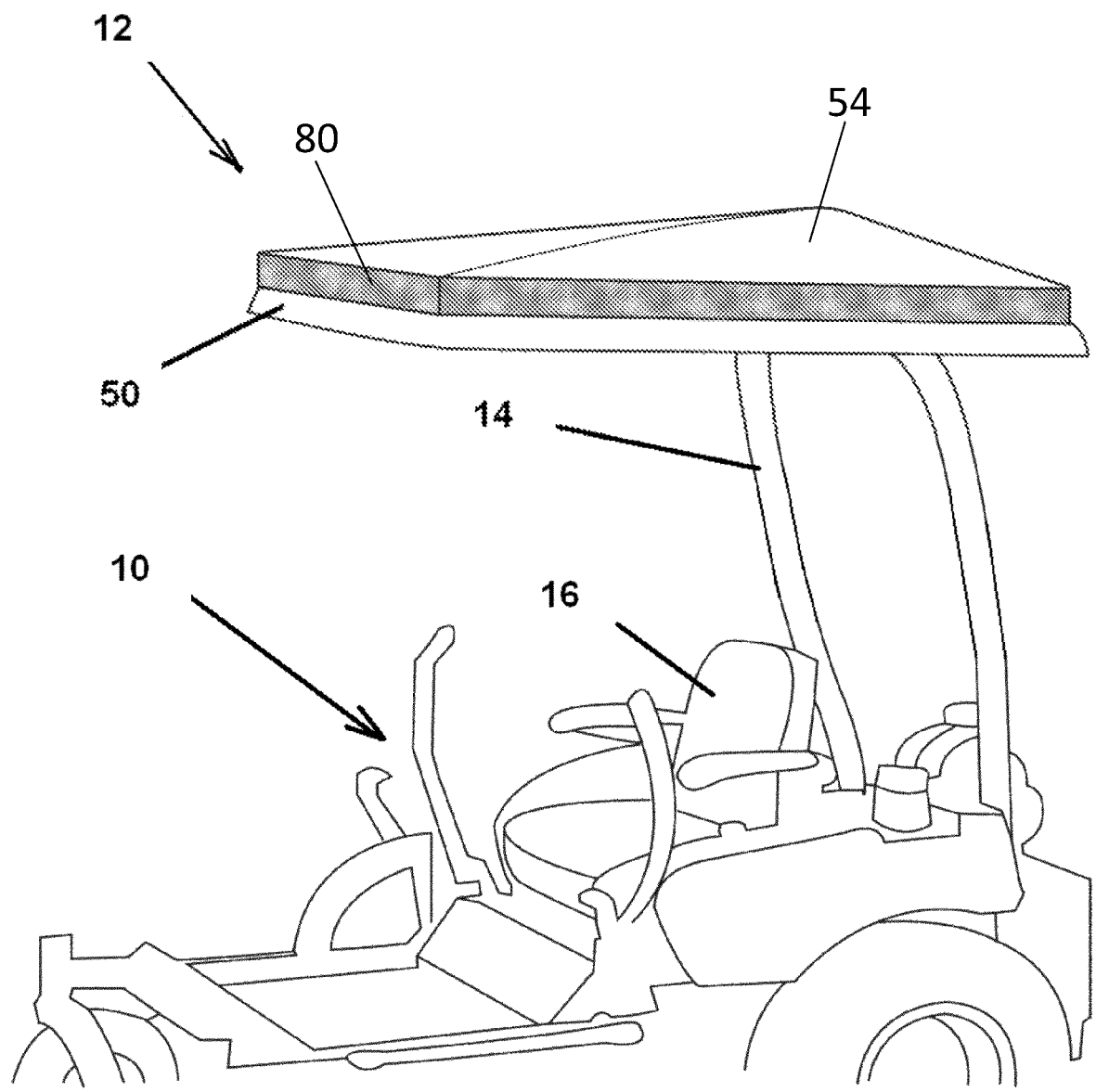
FIG. 14 is a perspective view of a riding vehicle fitted with an exemplary embodiment of a canopy and fan assembly.

Looking next at exemplary FIG. 14, FIG. 14 shows an open air motorized riding vehicle, such as a lawn mower 10, having a canopy and fan assembly 12. The canopy and fan assembly 12 is supported on a roll bar assembly 14. The canopy and fan assembly 12 extends horizontally from the roll bar assembly 14 forwardly over and above the operator seat 16 and as described below provides solar and precipitation protection for the operator and a downward flow of ambient air to provide protection from heat exposure, dust and biting insects. According to the depicted exemplary embodiment, the canopy and fan assembly 12 may have a vent 80 extending all of the way around the perimeter of the canopy and fan assembly 12, through which air may be drawn, rather than having an inlet disposed in the roof structure 54.

Figure 15:
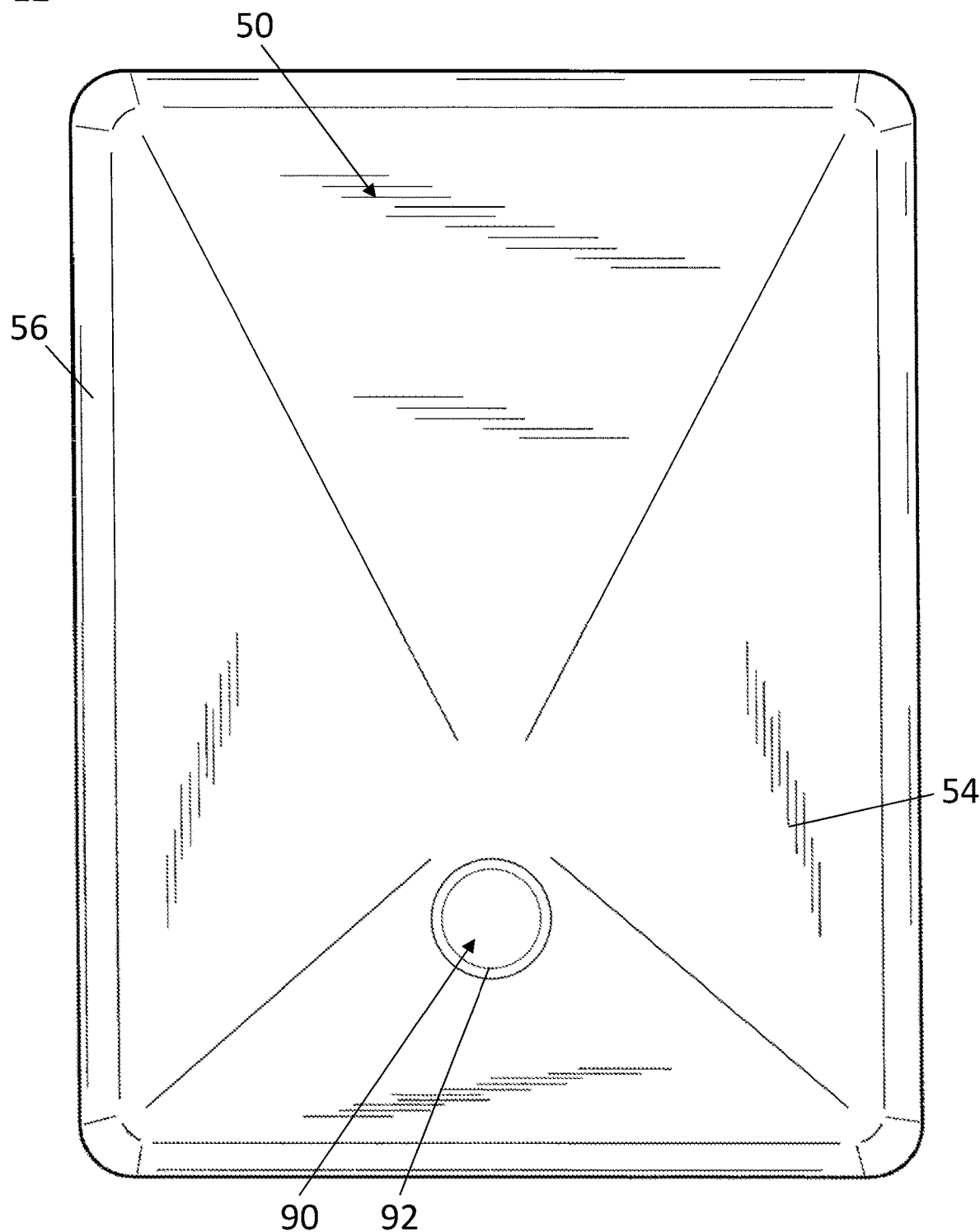
FIG. 15 is a top view of an exemplary embodiment of a canopy having an intake hole disposed therein.

Looking next at exemplary FIG. 15, FIG. 15 shows a top view of an exemplary embodiment of a canopy and fan assembly 12 in which the canopy shell 50 has an intake hole 90 disposed therein. According to an exemplary embodiment, the shell 50 of the canopy assembly may be, for example, a generally rectangular, slightly domed, roof section 54 peripherally terminating with a downwardly extending flared peripheral rim 56, though again other variants may be contemplated. According to an exemplary embodiment, a portion of the roof section 54, such as the rearmost part of the roof section 54 or any other part of the roof section 54 may have an intake hole 90 disposed therein through which air may be drawn, and which may have any shape, optionally may have a defined rim 92, and optionally may be shrouded, screened, or otherwise protected from the elements. In an exemplary embodiment, an intake hole 90 may be disposed in any part of the roof section 54, such as, for example, the top of the roof section 54, the front of the roof section 54, or multiple positions on the roof section 54 if desired. It may also be contemplated to place one or more intake holes 90 on the inward-facing side of the canopy shell 54 or even to connect one or more intake holes 90 to a pressurized air supply, if desired. (For example, in one exemplary embodiment, it may be contemplated to incorporate such a system into a vehicle equipped for spraying for pesticides, which may be provided with its own air supply in order to environmentally seal the vehicle. Such a system may also be combined with, for example, a return air system provided by providing one or more other intake holes 90 in the inward-facing side of the canopy shell 54, such as may be desired.)

Figure 16:
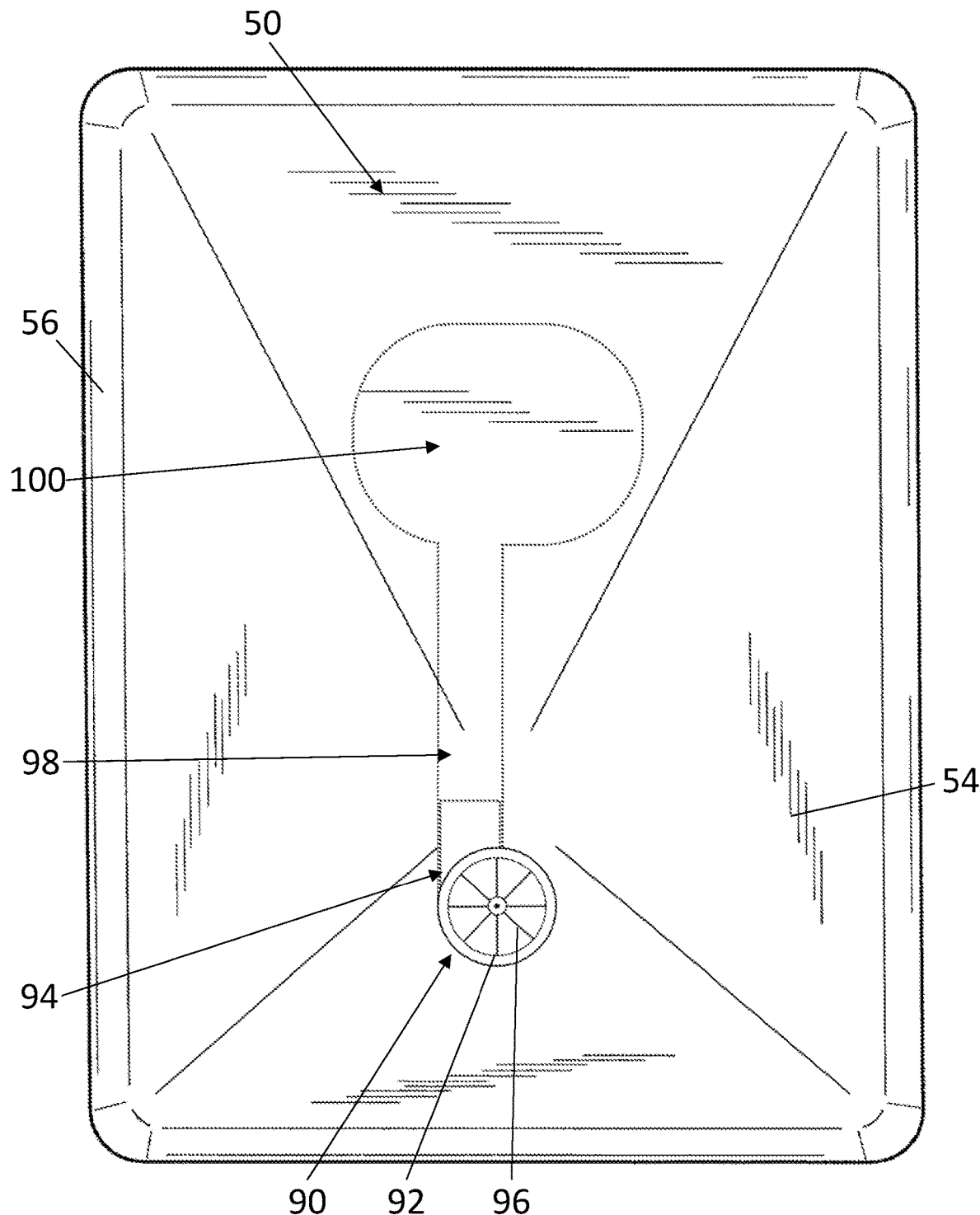
FIG. 16 is a top view of an exemplary embodiment of a canopy having an intake hole disposed therein and showing an exemplary fan structure.

Turning now to exemplary FIG. 16, FIG. 16 shows a top view of an exemplary embodiment of a canopy and fan assembly 12 in which the canopy shell 50 has an intake hole 90 disposed therein. According to an exemplary embodiment, the canopy and fan assembly 12 may have a fan 94 disposed within an air duct 98 so as to conduct air between the intake hole 90 and the outflow duct 100. According to an exemplary embodiment, the fan 94 may be, for example, a centrifugal fan, also called a blower or a squirrel-cage fan, and may be placed just inside the intake hole 90 so as to allow the fan 94 to more easily draw air from the intake hole 90. In other exemplary embodiments, another type of fan 94 may be used, or a fan 94 may be placed anywhere else in the system, such as may be desired.

According to an exemplary embodiment in which the fan 94 is a centrifugal (squirrel-cage) fan, numerous variations of the fan 94 may be contemplated. Generally, centrifugal fans use an impeller 96 that draws air from a first direction and then displaces this air radially, typically but not necessarily by a 90 degree angle, in order to change the direction of the airflow. Centrifugal fans may be constant displacement devices or constant volume devices, and as such may move a constant displacement or constant volume of air rather than a constant mass when the centrifugal fan is operating at a constant speed. According to some exemplary embodiments, a fan 94 that is a centrifugal fan may have a variable speed so as to be able to provide more or less air based on some condition, such as an external temperature, such as may be desired.

According to some exemplary embodiments, various blade styles may be contemplated for an impeller 96 of a centrifugal fan. For example, according to an exemplary embodiment, a centrifugal fan may have blades that curve forward, blades that curve backward, or blades that extend in a straight radial direction away from the center of the hub. According to an exemplary embodiment of a fan 94, a centrifugal fan may use straight radial blades so as to decrease the sensitivity of the fan system to particulates; according to other exemplary embodiments of a fan 94, other blade styles may be used instead.

Figure 17:
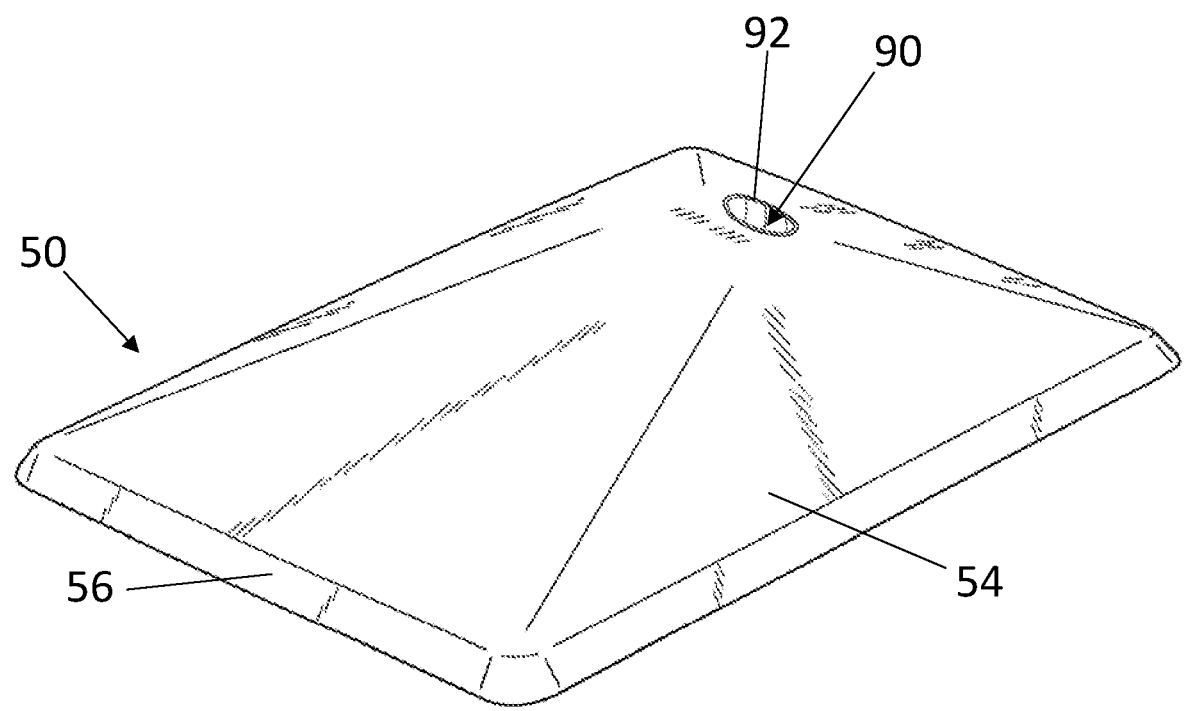
FIG. 17 is an isometric view of an exemplary embodiment of a canopy having an intake hole disposed therein.

Turning now to exemplary FIG. 17, FIG. 17 shows an isometric view of an exemplary embodiment of a canopy and fan assembly 12 in which the canopy shell 50 has an intake hole 90 disposed therein. According to an exemplary embodiment, an intake hole 90 may generally be disposed towards the rear of the canopy shell 50, but may be disposed elsewhere such as may be desired.

Figure 18:
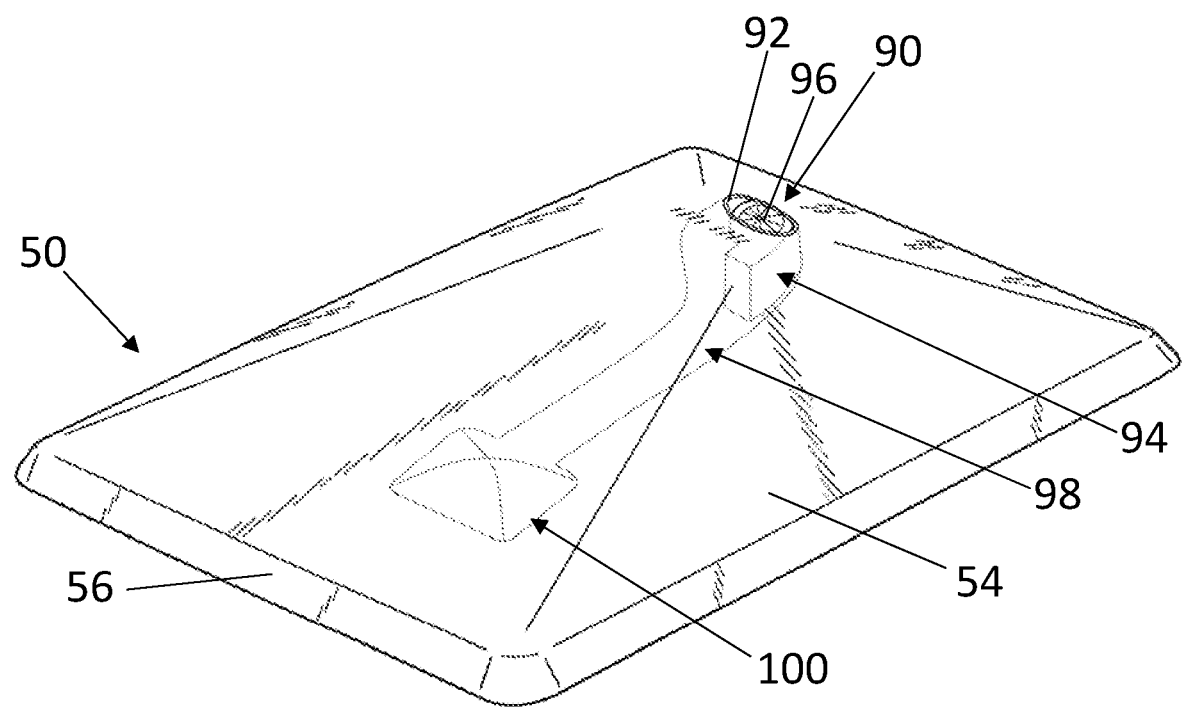
FIG. 18 is an isometric view of an exemplary embodiment of a canopy having an intake hole disposed therein and showing an exemplary fan structure.

Turning now to exemplary FIG. 18, FIG. 18 shows an isometric view of an exemplary embodiment of a canopy and fan assembly 12 in which the canopy shell 50 has an intake hole 90 disposed therein, and showing an exemplary fan structure 94. According to an exemplary embodiment, a fan 94 may be disposed so as to draw air from the intake hole 90 and conduct it through the air duct 98, which may terminate in an outflow duct 100. According to an exemplary embodiment, an outflow duct 100 and an air duct 98, as well as any other components of the system, may have any shape or size such as may be desired; for example, according to an exemplary embodiment, an outflow duct 100 may be a concave structure designed to distribute the outflow air throughout the cabin or may have a narrower shape designed to conduct air directly onto a driver of the vehicle, such as may be desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A fan assembly for a riding vehicle, comprising:
   at least one fan; and
   a canopy;
   wherein the at least one fan is attached to at least one of the canopy and the riding vehicle, and wherein the canopy is attached to at least one of the riding vehicle and the at least one fan, and
   wherein an element for capturing debris is disposed on at least one of an intake side or exhaust side of the at least one fan.

2. The fan assembly of claim 1, further comprising at least one opening disposed in the canopy, wherein the at least one fan receives air from above the canopy through the at least one opening and directs the air below the canopy.

3. The fan assembly of claim 2, wherein the at least one opening in the canopy is covered by at least one roof-cap.

4. The fan assembly of claim 1, further comprising at least one ventilation duct configured to guide airflow through the canopy to the at least one fan.

5. The fan assembly of claim 4, wherein the at least one ventilation duct is rear-facing.

6. The fan assembly of claim 1, wherein the canopy is a solid surface extending over the at least one fan and the at least one fan intakes air through the element for capturing debris.

7. The fan assembly of claim 1, wherein the canopy is affixed to the riding vehicle and the at least one fan is affixed to the canopy.

8. The fan assembly of claim 1, wherein the at least one fan is affixed to the riding vehicle and the canopy is affixed to the at least one fan.

9. The fan assembly of claim 1, wherein the at least one fan is affixed to the riding vehicle and the canopy is affixed to the riding vehicle.

10. The fan assembly of claim 2, further comprising a flange disposed around the at least one opening, wherein the flange is configured to secure the canopy to the at least one fan.

11. The fan assembly of claim 1, wherein the canopy is a solid surface extending over the at least one fan, and wherein the at least one fan intakes air directly from its direct surroundings.

12. The fan assembly of claim 1 further comprising an intake hole disposed in the canopy, an output duct disposed in the canopy, and at least one ventilation duct disposed in the canopy between the intake hole and the output duct.

13. The fan assembly of claim 12, wherein the at least one fan is disposed in the at least one ventilation duct.

14. The fan assembly of claim 12, wherein the at least one intake hole is rear facing on the canopy.

15. The fan assembly of claim 12, wherein the intake hole and output duct are offset in the canopy.

* * * * *